United States Patent [19]

Robinson

[11] 4,354,296

[45] Oct. 19, 1982

[54] METHOD AND APPARATUS FOR KILLING POULTRY

[76] Inventor: Ronald D. Robinson, Rte. 3, Box 200A, Gainesville, Ga. 30501

[21] Appl. No.: 236,587

[22] Filed: Feb. 20, 1981

[51] Int. Cl.³ ............................................. A22C 21/00
[52] U.S. Cl. ............................................. 17/52; 17/12
[58] Field of Search .......................... 17/12, 52, 11, 45

[56] References Cited

U.S. PATENT DOCUMENTS 3,490,092  1/1970  Harrison .......................... 17/12 X
4,257,143  3/1981  Lewis ................................. 17/12
4,293,978  10/1981 McDonald .......................... 17/12

Primary Examiner—Willie G. Abercrombie
Attorney, Agent, or Firm—Newton, Hopkins & Ormsby

[57] ABSTRACT

The jugular veins of chickens and other poultry are rapidly cut with precision and uniformity as birds are conveyed in succession past a rotary cutting knife. The necks of the birds are stretched at the cutting station by the coordinated action of upper camming bars acting on the bodies of the birds and lower spaced guide bars between which the necks travel longitudinally with the heads of the birds constrained below the guide bars and sliding on a spring-loaded pivoted pan structure which assures stabilization of the heads at the moment of cutting the jugular vein regardless of variations in head size and weight. The heads are presented to the knife with better vertical orientation to insure better engagement of the knife with the jugular vein. The necks are propelled through the cutting station by pusher elements attached in spaced relationship to an endless conveyor element immediately above the constraining parallel guide bars.

18 Claims, 10 Drawing Figures

METHOD AND APPARATUS FOR KILLING POULTRY

BACKGROUND OF THE INVENTION

Prior U.S. Pat. Nos. 3,243,839 and 3,765,055 disclose machines for killing poultry by cutting the jugular vein as the birds are transported through a killing station having a cutting means. The present invention seeks to improve on the cutting apparatuses and methods in these prior patents and others through provision of an apparatus and method which is more precise and more uniform in the operation of severing the jugular veins of fowl suspended heads down by their hocks on an overhead moving conveyor.

In accordance with the invention, at the cutting or killing station of the apparatus, the necks of birds are stretched and the heads of the birds are brought into sliding contact with an underlying spring-loaded pan structure which stabilizes the heads and assures vertical orientation thereof at the instant of cutting. Cutting occurs at the point of maximum neck stretch by an adjacent rotary blade which can be adjusted with precision across the neck axes of the birds. This particular method produces a much more efficient and uniform severing of the jugular vein near the base of the skull regardless of variations in the bird anatomy at that region.

Other features and advantages of the invention will become apparent to those skilled in the art during the course of the following description.

DETAILED DESCRIPTION

Figure 1:
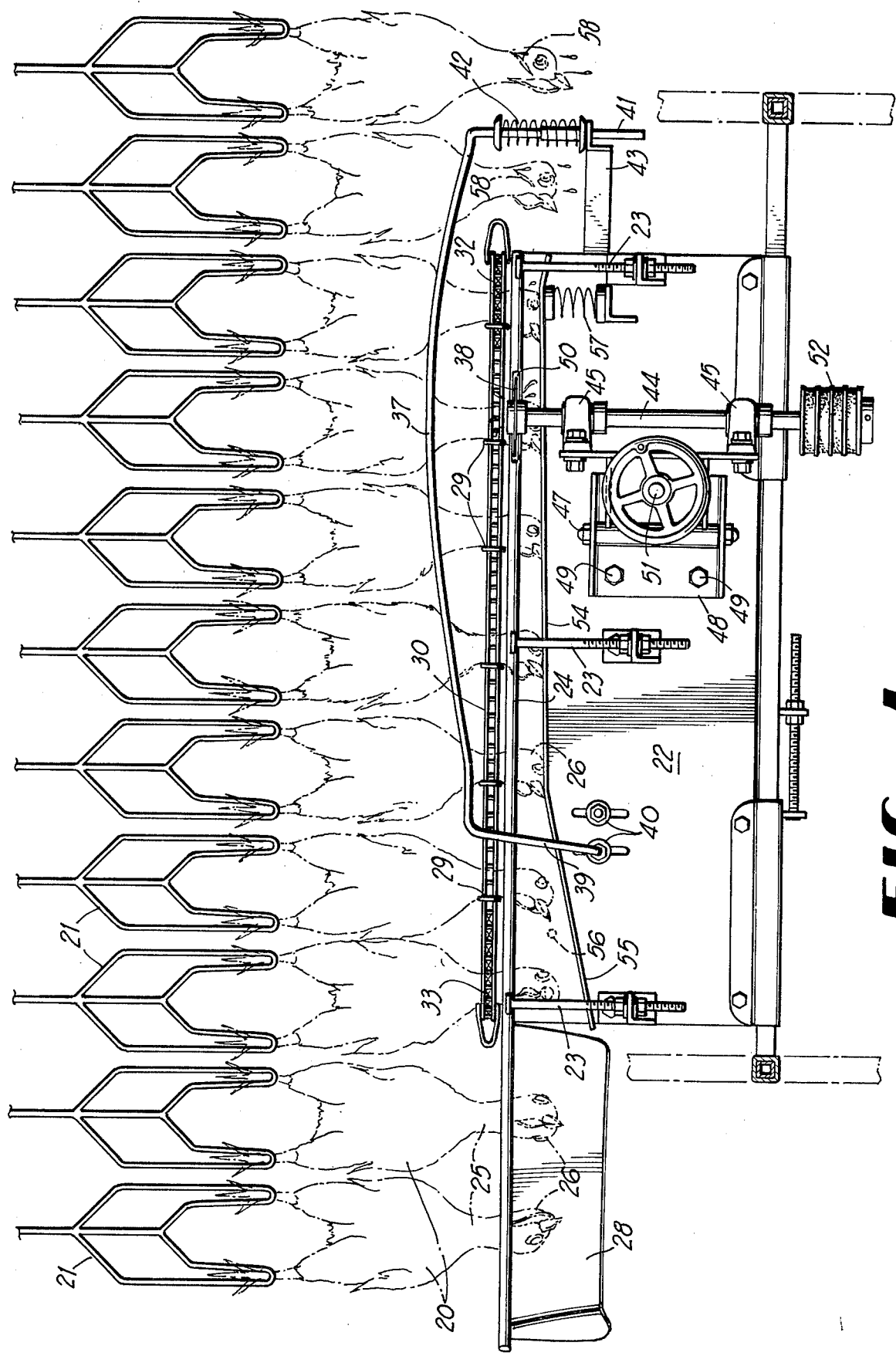
FIG. 1 is a side elevation of poultry killing apparatus according to the invention.
Figure 2:
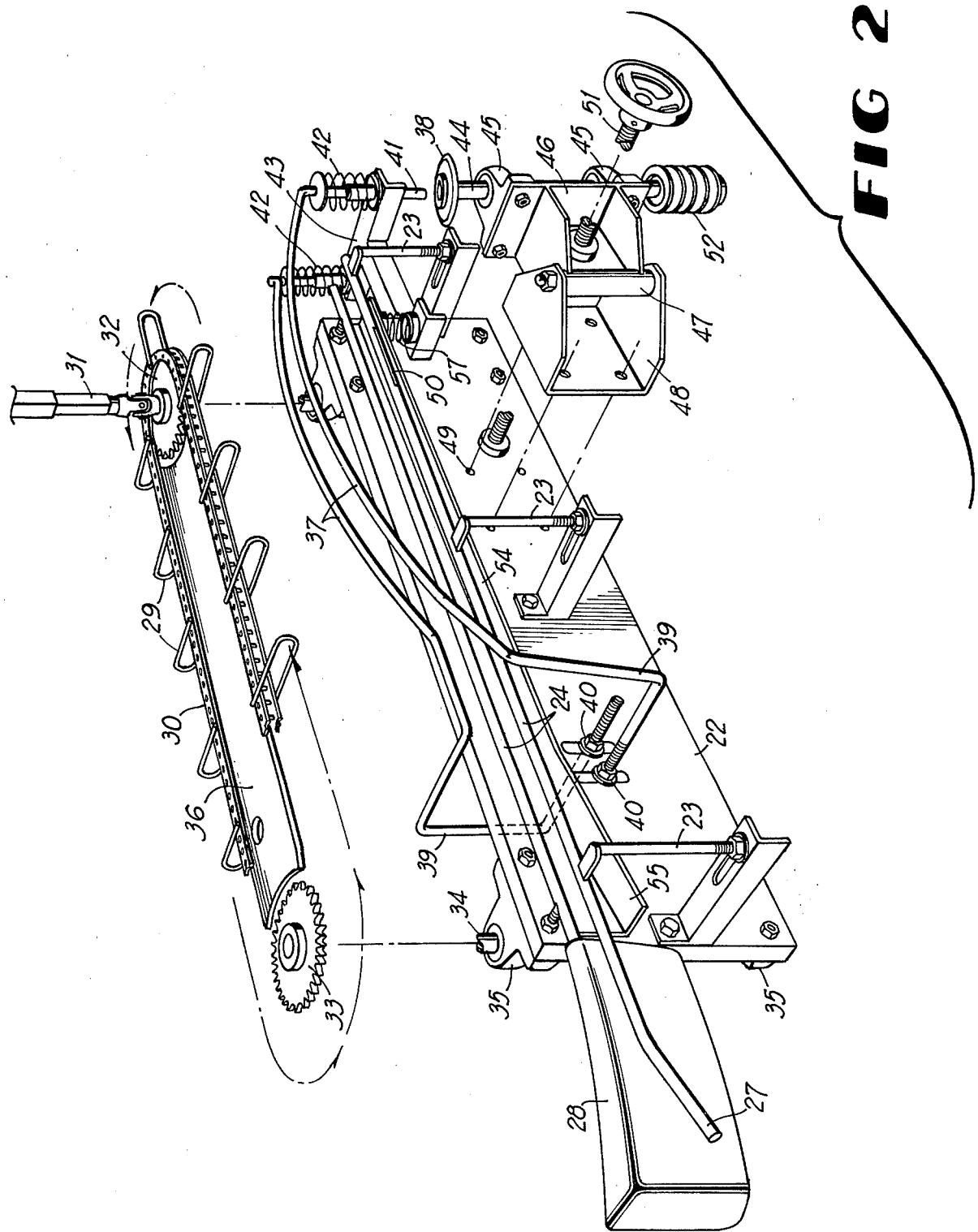
FIG. 2 is an exploded perspective view showing elements of the apparatus.

Referring to the drawings in detail wherein like numerals designate like parts, chickens 20 or other fowl are conveyed from left to right, as viewed in FIG. 1, by shackles 21 forming parts of a conventional overhead processing conveyor. The birds are suspended from the shackles heads down as they are transported at a uniform speed through the killing station which forms the subject matter of the invention. Prior to entering such station, the birds 20 have been stunned by the operation of conventional stunning equipment, not shown, and located upstream from the killing station. This stunning assures that the birds will not make any movement as they enter and pass through the killing apparatus which severs the jugular vein of each bird in succession.

The killing apparatus depicted in the drawings embodies a support frame 22 positioned at a proper elevation relative to the overhead conveyor shackles 21. On this frame are mounted for vertical adjustment through threaded support rods 23 a pair of horizontal rather closely spaced parallel elongated guide bars 24 between which the necks 25 of the birds pass at the killing station with the heads 26 of the birds exposed below the bars 24 and being unable to rise through the narrow slot between the bars 24. At their leading ends, one bar 24 has an angled portion 27 diverging from a deflector plate 28 on the other bar 24, such plate serving to arrest swinging movement of the bird heads as they enter the killing apparatus.

The necks and heads of the birds 20 are propelled positively through the apparatus at a coordinated speed with the over-head shackles 21 by a series of equidistantly spaced horizontal preferably U-shaped elements 29 or pushers secured to an endless horizontal chain conveyor 30 driven in timed relationship to the overhead shackles 21 by a vertical drive shaft 31 suitably connected to the overhead conveyor drive. The drive shaft 31 is coupled with the vertical axis sprocket gear 32 at one end of the chain 30. A like sprocket gear 33 engages and supports the other end of the endless chain 30. The shaft 34 for support of the sprocket gear 33 is held in bearings 35 on the back of frame 22. A horizontal positive guide plate 36 for the conveyor chain 30 is provided to prevent sagging thereof and to assure movement of the chain in a horizontal plane.

The apparatus further comprises, in accordance with an important feature thereof, a pair of spaced upwardly arched camming bars 37 which rise considerably above the conveyor chain 30 and horizontal guide bars 24 and extend longitudinally at the killing station between points forwardly of and rearwardly of the location of a vertical axis rotary jugular vein severing blade or knife 38. The camming bars 37 include forward terminals 39 which are vertically adjustably attached as at 40 to the frame 22 at points slightly downstream of the sprocket gear 33. Rear vertical terminals 41 of the camming bars 37 are supported resiliently and biased upwardly by spring means 42 supported on a bracket 43 secured to the frame 22. The terminals 41 and spring means 42 are disposed somewhat downstream from the sprocket gear 32. The high point of camming bars 37 is above the axis of circular cutting blade 38. The spacing of the bars 37 is substantially greater than that of the bars 24 to enable the former to act cammingly on the bodies of the birds 20 in the neck stretching operation.

The aforementioned blade 38 is mounted on a vertical axis shaft 44 journaled in bearings 45 fixed to a swing bracket 46 which has a vertical axis of swing on a shaft 47, the latter shaft being held in a U-bracket 48 secured as at 49 to the frame 22. The blade 38 revolves within a slot 50 formed through one guide bar 24, whereby the cutting edge of the circular blade projects into the longitudinal passageway between the guide bars 24 through which the necks of the birds travel.

Figure 3:
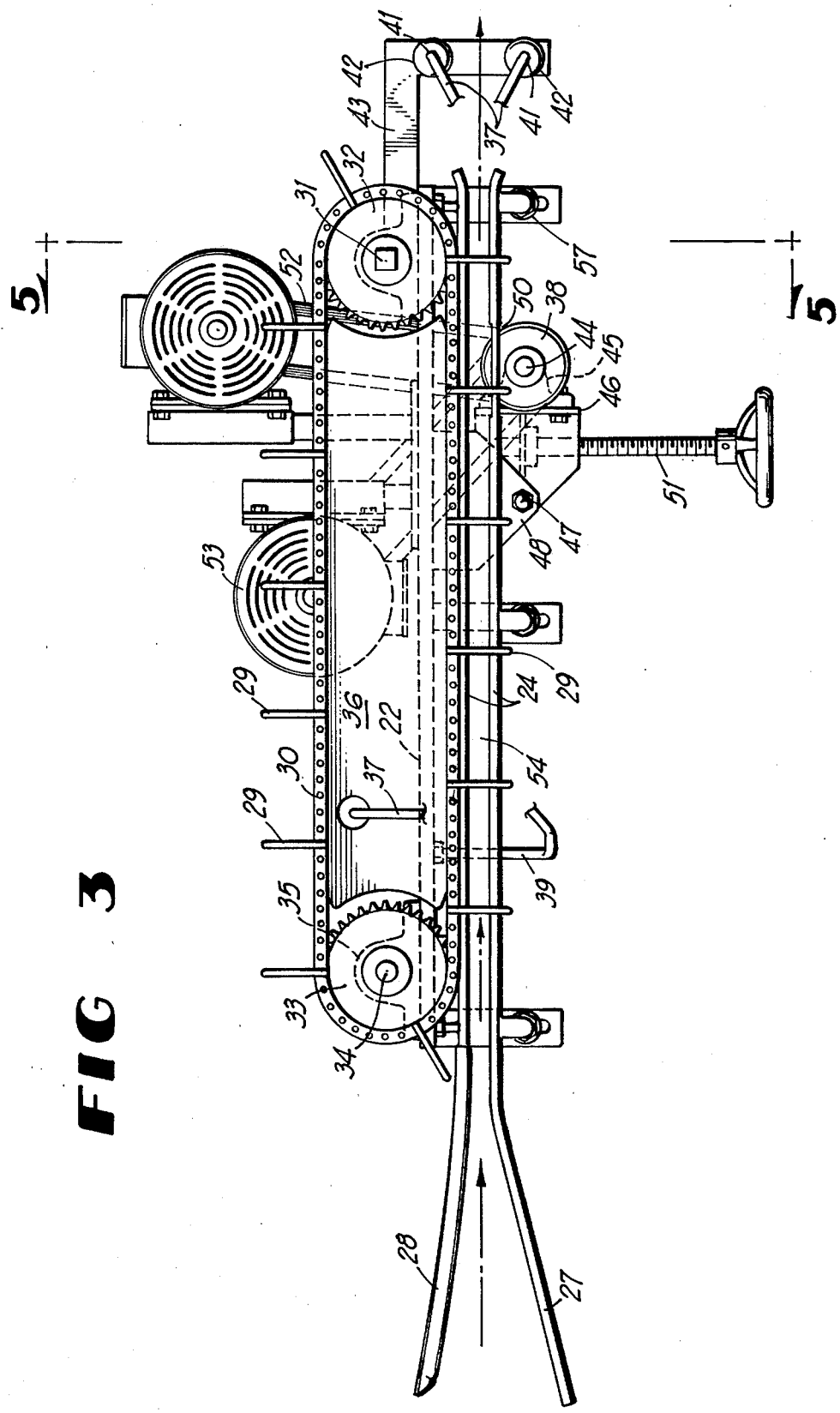
FIG. 3 is a plan view of the apparatus.
Figure 4:
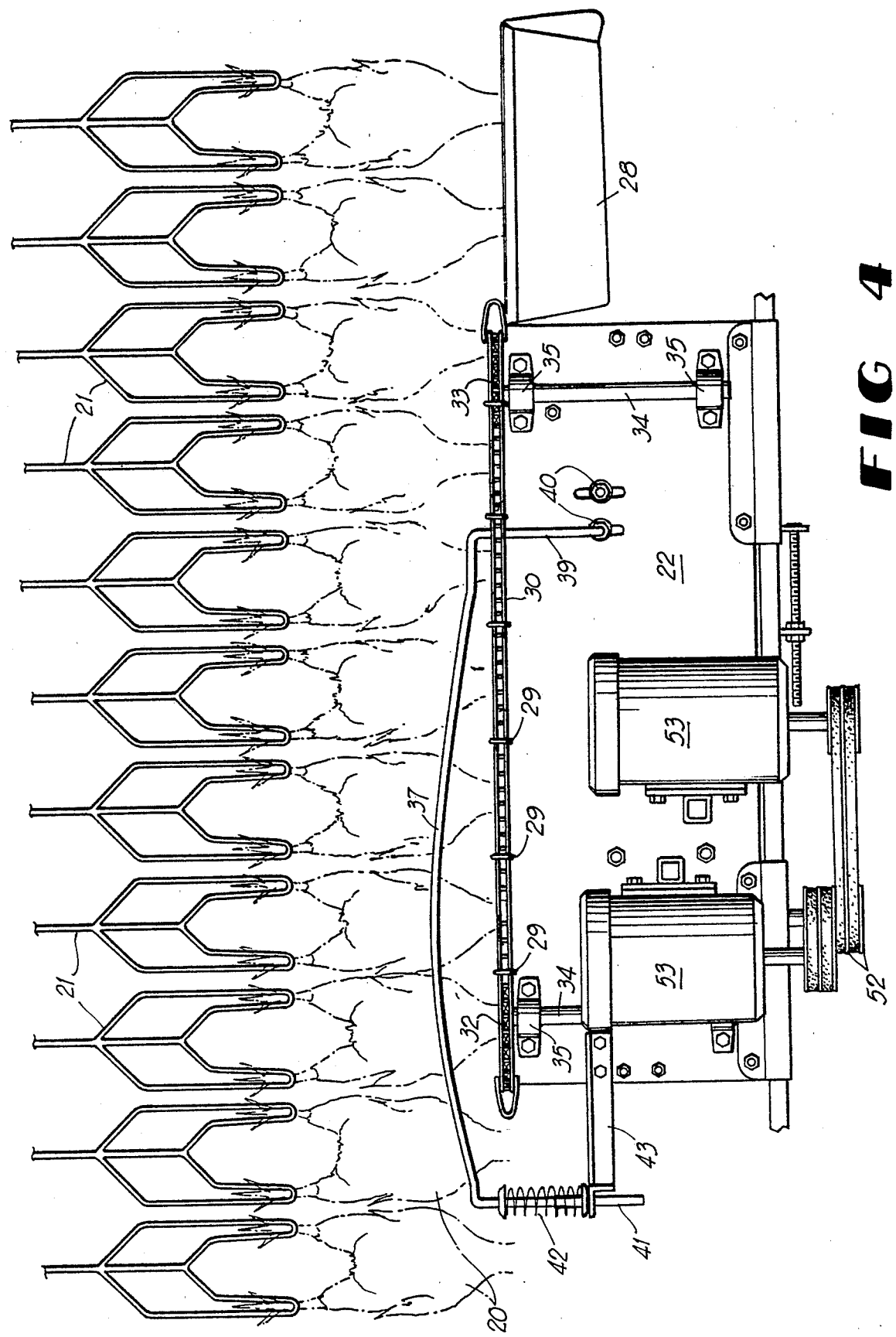
FIG. 4 is a rear side elevation thereof.
Figure 5:
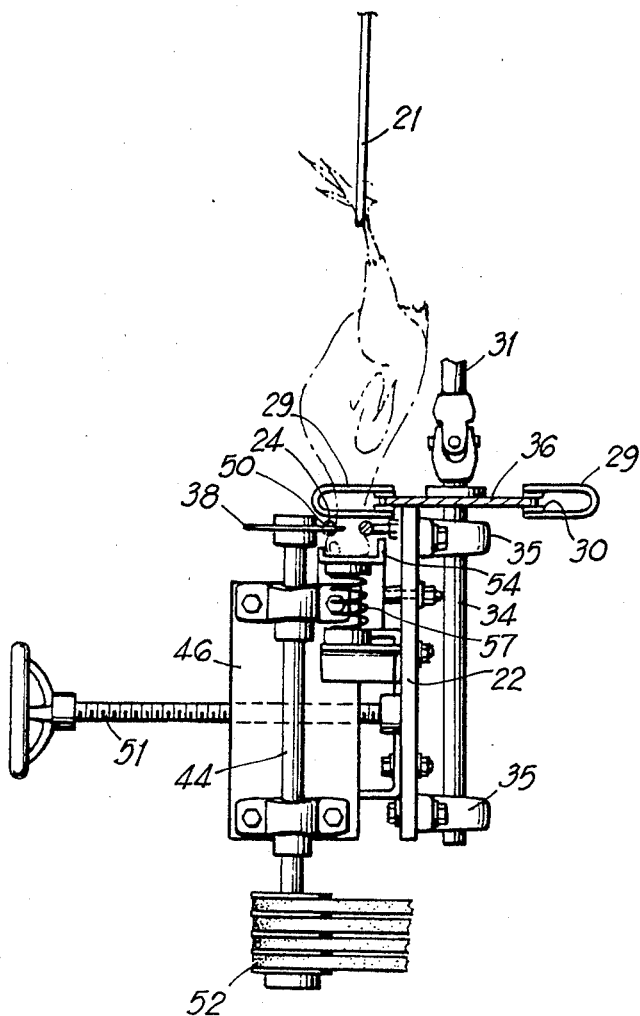
FIG. 5 is a transverse vertical section taken on line 5—5 of FIG. 3, with parts omitted.

The depth of projection of the blade 38 into this passage is precisely adjustable by means of a blade adjusting screw 51 having a hand wheel, as shown. Operation of this screw produces forward or rear swinging of the blade 38 with the bracket 46 around the vertical axis shaft 47 to position the cutting edge of the blade a greater or lesser distance into the passageway defined by the two guide bars 24, FIGS. 3 and 5. When the adjusting screw 51 is stationary, it serves to lock the blade 38 with precision in the selected adjusted position.

The shaft 44 of blade 38 is driven in rotation by belt transmission means 52, operated by drive motors 53 attached to frame 22.

Figure 6:
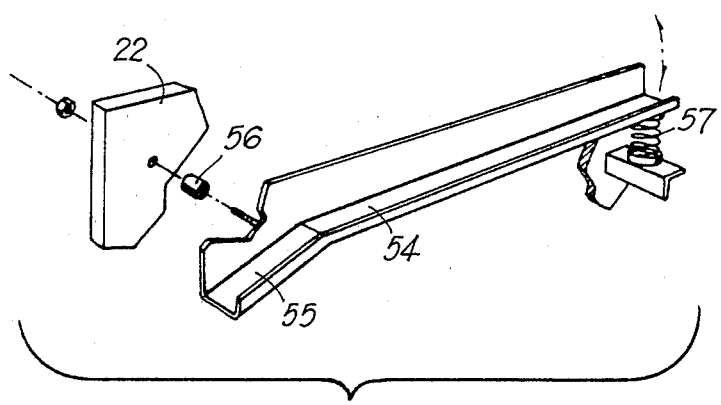
FIG. 6 is an exploded perspective view of a poultry head guiding and stabilizing pan.

A final important aspect of the invention resides in a head guidance, support and stabilizing tray or trough 54 of U-cross section which is arranged so that its floor is beneath the horizontal bars 24 at a slight inclination thereto, FIG. 1, the trough sloping gradually upwardly toward its downstream end adjacent to the sprocket gear 32 from a more steeply sloping entrance portion 55 near sprocket gear 33. At this entrance portion, the trough 54 is rockably supported on a pivot element 56, FIG. 6, carried by the frame 22. The far end of the trough 54 is resiliently supported by a spring 57 seated on a part projecting from the frame 22. As shown in FIG. 6, the trough 54 can swing in an arc centered on the pivot element 56 through a limited distance.

Other components of the apparatus are of a relatively minor and conventional nature and need not be described.

OPERATION

The suspended birds 20 enter the killing apparatus from left to right, FIG. 1, moving with the overhead conveyor shackles 21. The horizontal chain conveyor 30 is coordinated with this movement and the pusher loops 29 are projecting across the tops of guide bars 24, FIG. 3, and are also moving from left to right at the same speed as the shackles 21. The blade 38 has been adjusted by use of the screw 51 and is revolving under influence of the described motor and transmission means.

As the birds enter the apparatus between the diverging elements 27 and 28, swinging of their bodies and heads is arrested substantially. As they travel further into the apparatus the neck of each bird in succession is engaged and pushed forwardly by one of the loop elements 29. Shortly thereafter, the body of each bird begins to ride up on the gradually arched camming bars 37 while the pushing action of the element 29 continues. This action, together with the constraining action of the two guide bars 24 on the bird heads 26, stretches the necks 25 to a taut state and renders the necks vertical.

Figure 7:
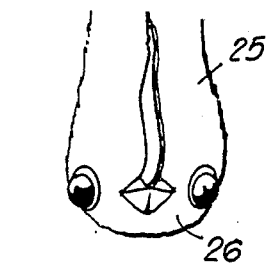
FIGS. 7 through 10 are partly diagrammatic elevational views depicting the support and orientation of the bird head as it approaches the cutting blade of the apparatus.
Figure 8:
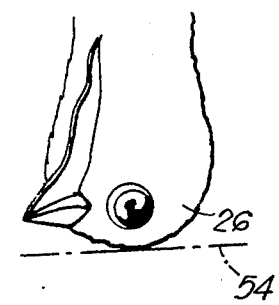
Figure 9:
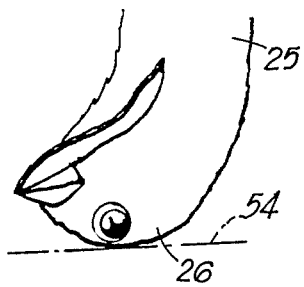
Figure 10:
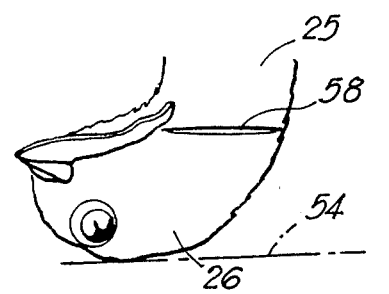

Simultaneously, the heads 26 are passing through the slightly inclined trough 54 below the bars 24. This trough does several things to properly orient the bird heads and present them to the blade 38 in the optimum position. First, the trough will rotationally orient each head 26 from a random position shown in FIG. 7 which prevails when the heads first enter the upstream end of the trough. Gradually, each head is turned from this position to the optimum cutting position shown in FIG. 10. Secondly, the floor of the trough 54 slidably supports and guides each head 26 as it moves toward the blade 38 in a vertical position so that the horizontal cut 58 near the base of the skull is produced by the blade 38 in the optimum location for severing the jugular vein in order to kill and bleed out the poultry.

The trough 54 can yield downwardly through compression of the spring 57 to compensate for variation in head size without altering the neck stretching capability of the apparatus caused by the elements 37, 24 and 29. Thirdly, the trough serves to further stabilize the head during the actual cutting operation by the blade 38.

The method achieves precision and uniformity of severance of the jugular vein through operation of a simple and positive apparatus which is adjustable. Heretofore, in the prior art, such results have not been possible.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A method of killing poultry comprising moving birds in succession along a horizontal path with the birds hanging heads downward, guidingly engaging the necks and heads of the birds during such movement and restraining the heads from moving upwardly, simultaneously cammingly engaging the bodies of the birds during such movement and displacing the bodies upwardly relative to the heads and thereby stretching the necks of the birds, and severing the jugular veins of the birds in succession while the necks are stretched.

2. The method of claim 1, and additionally engaging the heads of the birds during such movements to orient the heads rotationally to an optimum position for severing the jugular vein.

3. An apparatus for killing stunned fowl by severing the jugular vein with precision and uniformity comprising means to convey birds in succession with their heads hanging downwardly, horizontal guide means engageable with the necks and heads of conveyed birds and restraining upward movement of the heads, cam means in the path of movement of the conveyed bird and engaging the bodies of the birds in succession to stretch the necks of the birds while they are moving, and means to sever the jugular veins of the birds in succession during their movement and while their necks are stretched.

4. An apparatus for killing stunned fowl as defined in claim 3, and said means to convey birds comprising an overhead conveyor including shackles suspending the birds by their legs, and a cooperating horizontal conveyor near the horizontal guide means having spaced pusher elements which engage and push the necks of the birds along the guide means in a positive manner.

5. An apparatus for killing stunned fowl as defined in claim 3, and the horizontal guide means comprising a pair of elongated spaced substantially parallel guide bars defining a guide passage for the necks of the birds.

6. An apparatus for killing stunned fowl as defined in claim 5, and the cam means comprising a pair of spaced apart arched camming bars spaced above said parallel guide bars and having a high point adjacent to the means to sever the jugular veins.

7. An apparatus for killing stunned fowl as defined in claim 6, and resilient support means for downstream terminals of the arched camming bars.

8. An apparatus for killing stunned fowl as defined in claim 3, and head orientation and stabilizing means beneath the horizontal guide means and extending longitudinally thereof.

9. An apparatus for killing stunned fowl as defined in claim 8, and the head orientation and stabilizing means comprising a trough-like member slidably receiving the heads of fowl traveling through the apparatus.

10. An apparatus for killing stunned fowl as defined in claim 9, and horizontal transverse axis pivotal support means for the upstream end of the trough member, the downstream end of such member being resiliently supported for limited swinging movement on the axis of said pivotal support means.

11. An apparatus for killing stunned fowl as defined in claim 10, and the floor of the trough-like member gradually sloping upwardly toward its downstream end.

12. An apparatus for killing stunned fowl as defined in claim 3, and said means to sever the jugular veins comprising a vertical axis rotary blade having its cutting edge in the path of travel of the bird necks of the conveyed birds.

13. An apparatus for killing stunned fowl as defined in claim 5, and the means to sever the jugular veins comprising a vertical axis rotating circular blade having its cutting edge projecting into the space between the parallel guide bars.

14. An apparatus for killing stunned fowl as defined in claim 13, and one of said guide bars having a slot through which said rotating blade projects into said space.

15. An apparatus for killing stunned fowl as defined in claim 12, and means including a screw shaft to adjust said blade horizontally and laterally toward and away from said path of travel.

16. An apparatus for killing stunned fowl as defined in claim 15, and the last-named means further including a vertical axis pivotal support for said blade.

17. An apparatus for killing stunned fowl as defined in claim 3, and means to adjust the horizontal guide means vertically and to lock it in selected adjusted positions.

18. An apparatus for killing stunned fowl as defined in claim 8, and means to adjust the horizontal guide means vertically relative to said head orientation and stabilizing means.

* * * * *